United States Patent
Li

(10) Patent No.: US 11,478,878 B2
(45) Date of Patent: Oct. 25, 2022

(54) LASER CUTTING SYSTEM FOR CUTTING ARTICLES AND FORMING FILTRATION TUBES

(71) Applicant: Synfuel Americas Corporation, Sterling, VA (US)

(72) Inventor: Yongwang Li, Beijing (CN)

(73) Assignee: SYNFUEL AMERICAS CORPORATION, Sterling, VA (US)

( * ) Notice: Subject to any disclaimer, the term of this patent is extended or adjusted under 35 U.S.C. 154(b) by 103 days.

(21) Appl. No.: 16/584,841

(22) Filed: Sep. 26, 2019

(65) Prior Publication Data
US 2020/0101565 A1  Apr. 2, 2020

Related U.S. Application Data

(60) Provisional application No. 62/738,853, filed on Sep. 28, 2018.

(51) Int. Cl.
*B23K 26/38* (2014.01)
*B23K 101/06* (2006.01)

(52) U.S. Cl.
CPC .......... *B23K 26/38* (2013.01); *B23K 2101/06* (2018.08)

(58) Field of Classification Search
CPC ............... B23K 26/08; B23K 26/0823; B23K 26/0853; B23K 26/0869; B23K 26/38;
(Continued)

(56) References Cited

U.S. PATENT DOCUMENTS

| 5,254,834 A | 10/1993 | Johnson |
|---|---|---|
| 6,163,010 A | 12/2000 | Kobsa |

(Continued)

FOREIGN PATENT DOCUMENTS

| CN | 102139415 A | 8/2011 |
|---|---|---|
| CN | 104759754 A | 7/2015 |

(Continued)

OTHER PUBLICATIONS

International Preliminary Report on Patentability issued in corresponding International Application No. PCT/US2019/053313 dated Sep. 15, 2020 (20 pages).

(Continued)

*Primary Examiner* — Justin C Dodson
(74) *Attorney, Agent, or Firm* — Pillsbury Winthrop Shaw Pittman, LLP

(57) ABSTRACT

A laser cutting system for cutting articles, such as tubes, and method of using the same. The laser cutting system can cut slots, holes, and/or pores into each article or tube to form filtration tubes, for example. The system includes a delivery system for delivering a laser beam from a laser source, at least one mirror, a focusing objective lens, a gas source, and a delivery nozzle. A first stage holds each article in a longitudinal direction, and may rotate the article axially during delivery of the gas and laser beam towards the article and move the article longitudinally relative to the delivery nozzle. A second stage is provided in the system for moving the delivery nozzle relative to the article being held by the first stage. A controller controls actuation of the laser beam and the gas source, and movement of the first stage and the second stage.

22 Claims, 10 Drawing Sheets

(58) Field of Classification Search
CPC .. B23K 26/388; B23K 26/703; B23K 26/705; B23K 26/707
See application file for complete search history.

(56) References Cited

U.S. PATENT DOCUMENTS

| | | | |
|---|---|---|---|
| 9,511,451 B2 | 12/2016 | Baxter et al. | |
| 2003/0098295 A1* | 5/2003 | Kawamoto | B29C 66/80 219/121.66 |
| 2006/0044981 A1 | 3/2006 | Egawa et al. | |
| 2008/0021540 A1 | 1/2008 | Saunders | |
| 2010/0193482 A1* | 8/2010 | Ow | B23K 26/38 219/121.67 |
| 2011/0120981 A1* | 5/2011 | Paganelli | B23K 26/147 219/121.67 |
| 2011/0309059 A1 | 12/2011 | Humphreys | |
| 2013/0315514 A1* | 11/2013 | Williams | F16C 29/06 384/43 |
| 2015/0060419 A1 | 3/2015 | Green et al. | |
| 2015/0352666 A1* | 12/2015 | Fujita | B23K 26/00 219/121.61 |
| 2016/0082549 A1* | 3/2016 | Yoshida | B23K 26/082 219/121.71 |
| 2017/0182593 A1* | 6/2017 | Richerzhagen | B23K 26/1476 |
| 2017/0189016 A1 | 7/2017 | Gross et al. | |
| 2017/0232558 A1* | 8/2017 | Kano | B23K 26/0861 219/121.72 |

FOREIGN PATENT DOCUMENTS

| | | |
|---|---|---|
| CN | 106493475 A | 3/2017 |
| JP | S 5269091 | 6/1977 |
| JP | H07236987 | 9/1995 |
| JP | 2005211962 | 8/2005 |
| JP | 2012086243 | 5/2012 |
| JP | 2017131966 | 8/2017 |
| WO | 2004056685 A1 | 7/2004 |
| WO | 2012000193 A1 | 1/2012 |

OTHER PUBLICATIONS

International Search Report and Written Opinion of the International Search Authority issued in corresponding International Application No. PCT/US2019/053313 dated Jan. 17, 2020 (14 pages).
Examination Report dated Feb. 9, 2022, issued in the corresponding India Patent Application No. 202147018534, pp. 1-7.
Extended European Search Report dated May 19, 2022, issued in the corresponding European Patent Application No. 19806187.8, pp. 1-10.
Examiner's Requisition (Office Action) from Canada dated May 10, 2022, issued in the corresponding Canadian Patent Application No. 3,114,625, pp. 1-13.
Office Action with English translation dated Jul. 5, 2022, issued in the corresponding Japanese Patent Application No. 2021-517226, pp. 1-10.

* cited by examiner

LASER CUTTING SYSTEM FOR CUTTING ARTICLES AND FORMING FILTRATION TUBES

CROSS-REFERENCE TO RELATED APPLICATIONS

This application claims the benefit of U.S. Provisional Patent Application No. 62/738,853, filed Sep. 28, 2018, which is hereby expressly incorporated by reference in its entirety.

BACKGROUND

Field

The present disclosure is generally related to a laser cutting system for cutting articles.

Description of Related Art

Filtration is an important method that typically is used to separate solids from fluids (gases or liquids) for a variety of industries, from oil and gas processing to even food processing industries. In most industrial processes that rely on filtration, the replacement of filtration media is very frequent, leading to significant cost increase and the rise of issues of processing or recovery of the solid wastes of used filtration media.

The filtration media currently available for industrial application are diverse. Filtration elements and assemblies formed from filtration tubes have been successful for filtering solids from liquids in a number of different industries.

Forming filtration tubes such that the tubes themselves and their pores are without defect is critical to accuracy in the filtering process.

SUMMARY

It is an aspect of this disclosure to provide a laser cutting system for cutting articles, such as tubes to form a filtration element. The laser cutting system is configured to cut a plurality of slots, holes, and/or pores into each article or tube. The system includes a delivery system for delivering a laser beam. The delivery system includes a laser source configured to provide a laser beam, at least one mirror, a focusing objective lens, a gas source, and a delivery nozzle. The delivery nozzle is configured to deliver gas from the gas source and the laser beam from the laser source towards the article to cut the plurality of slots, holes, and/or pores therein in a predetermined pattern along the article. A first stage is provided in the system for holding each article to be cut by the laser beam in a longitudinal direction. The first stage is configured to (a) rotate the article axially during delivery of the gas and laser beam towards the article and also (b) move the article longitudinally relative to the delivery nozzle as the laser beam is delivered to the article. A second stage is provided in the system for moving the delivery nozzle relative to the article being held by the first stage. A controller controls actuation of the laser beam and the gas source, and movement of the first stage and the second stage.

Another aspect provides a method for cutting a plurality of slots, holes, and/or pores into articles, such as tubes, using the above-noted laser cutting system. The method includes: placing the article in the first stage; moving the delivery nozzle relative to the article using the second stage; and controlling the controller to deliver the laser beam and the gas towards the article to thereby cut the plurality of slots, holes, and/or pores therein in the predetermined pattern along the article. During delivery of the laser beam, the controller controls movement of the article such that the article is continuously rotated axially and moved longitudinally using the first stage.

Other features and advantages of the present disclosure will become apparent from the following detailed description, the accompanying drawings, and the appended claims.

DETAILED DESCRIPTION

The herein disclosed laser cutting system 100 or apparatus, and it method of use, is designed for cutting or slotting articles. In the embodiments below, the laser cutting system 100 is described as cutting tubes to form filtration tubes, i.e., tubes that have micro slots, micro holes, or micro pores (also referred to herein as simply "slots", "holes," and "pores", respectively) and are configured to filter solids from fluids when such material is filtered through those tubes. In particular, the system or apparatus as described herein is used for drilling the micro slots/pores into walls of pre-fabricated tubes. Nonetheless, the disclosed laser cutting system 100 may be utilized for cutting several types of articles, and should not be limited to simply cutting tubes and/or cutting slots, holes, and/or pores in such articles.

In addition to the system itself, this disclosure describes a method of cutting articles or tubes using the system. In one embodiment, the slot pattern cut into the article or tube is performed by synchronizing laser pulses with simultaneous rotational and linear stage motion.

Figure 1:
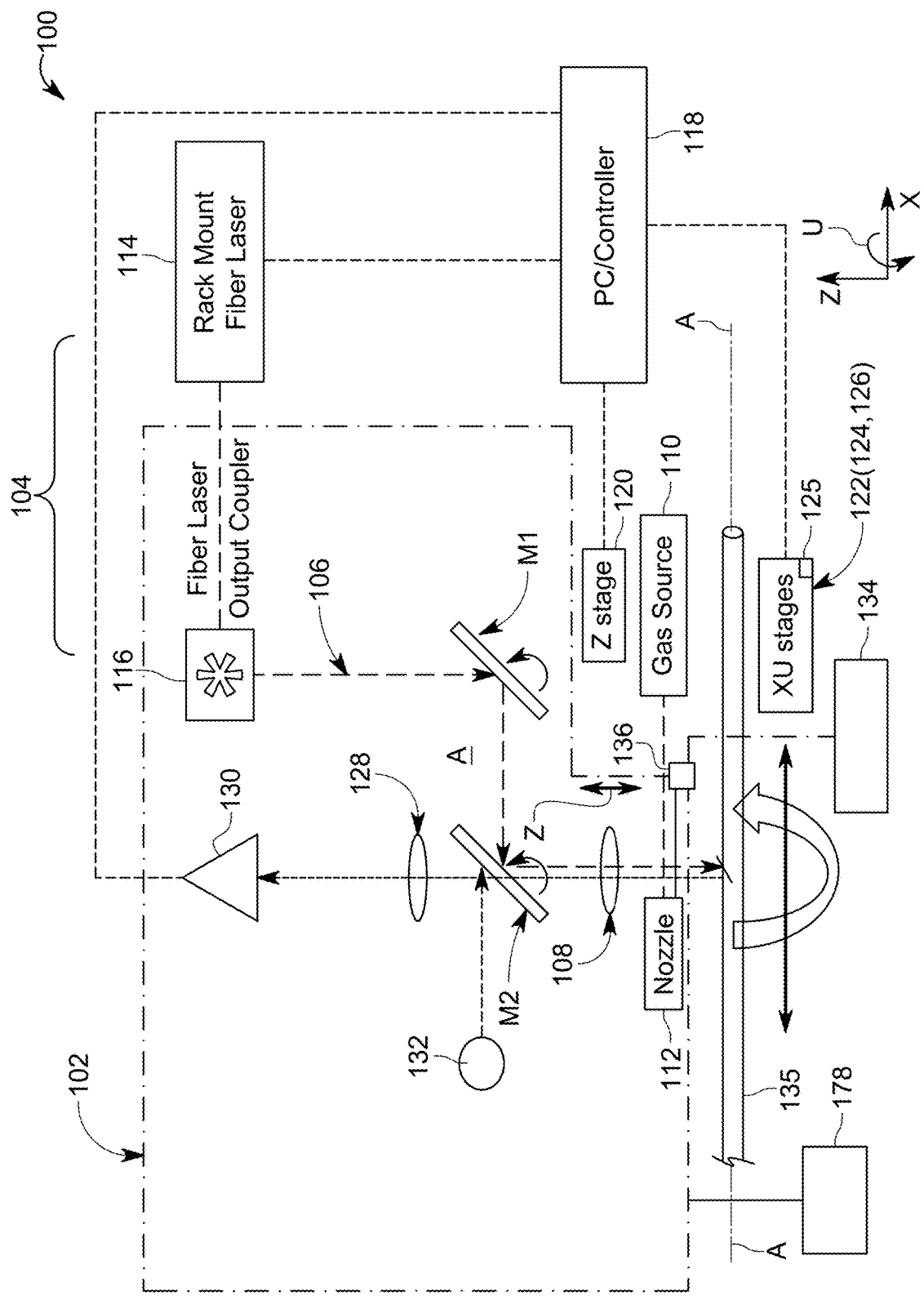
FIG. 1 is schematic drawing of a laser cutting system for cutting slots, holes, and/or pores into articles or tubes, in accordance with an embodiment herein.

FIG. 1 is schematic drawing of the laser cutting system 100, also referred to as "system 100". The system 100 includes a delivery system 102 for delivering a laser beam. The delivery system 102 includes a laser source 104 configured to provide a laser beam 106, at least one mirror, a focusing objective lens 108, a gas source 110, and a delivery nozzle 112 (or laser head).

The laser source 104 may be mounted to a rack 114 and include a laser output coupler 116 that includes an armored fiber cable for directing a laser light from the laser source 104 to the delivery nozzle 112. In an embodiment, the laser source 104 is a 70 watt quai-continuous wave (QCW) fiber IR laser. In an embodiment, the cable may be used to connect the delivery nozzle 112 to a 500 watt fiber IR laser (1070 nm) source. In another embodiment, the laser source 104 is a 1000 watt fiber IR laser. In yet another embodiment, two or more laser sources 104 may be used. The type of laser used for cutting is not limited. For example, the laser source 104 may be a fiber laser or another laser type such as an ultrafast later (i.e., picosecond pulse laser) or a green laser. In an embodiment, the type of laser used for the laser source 104 may be based on the type of material being cut, and/or the desired laser power.

At least one mirror is provided in the system 100 to direct and reflect the laser beam 106. In the illustrated embodiment of FIG. 1, two mirrors M1 and M2 are shown in the system 100 and mounted in the path of the laser beam 106. Adding a second mirror further assists in beam alignment. Both of the mirrors M1 and M2 are configured for rotation via a rotatable, kinematic mounts (not shown). An angle of the mirrors M1 and M2 may be rotated or adjusted using a controller 118, for example, to redirect the laser beam 106. As represented in FIG. 1, the laser beam 106 may be directed from the coupler 116 towards the first mirror M1. The beam 106 reflects off of mirror M1 (e.g., shown here in the horizontal direction as an example only), then reflects off of second mirror M2 (e.g., shown here being directed towards the delivery nozzle 112 downwardly in a vertical direction, as an example only). In an embodiment, more than 95% of the beam energy is reflected off of the second mirror M2 and towards the delivery nozzle 112. In an embodiment, some or a portion of the energy from the laser beam may pass through the mirror M2 and be absorbed by an optional monitoring device 132 (described later). In accordance with an embodiment, approximately 1 percent to approximately 5 percent of the energy passes through the mirror M2. In another embodiment, approximately 4 percent of the energy from the laser beam passes through the mirror to the monitoring device 132.

The focusing objective lens 108 may be a demagnification lens that receives the reflected laser beam from the second mirror M2 and directs the laser beam to the delivery nozzle 112. In accordance with an embodiment, the lens 108 may be in the range of 30 mm to 300 mm. In another embodiment, the lens 108 may be in the range of 50 mm to 80 mm. In yet another embodiment, a 50 mm, 75 mm, or 80 mm objective lens may be used as lens 108.

The delivery nozzle 112 is a gas assisted nozzle that is designed to deliver and/or direct the laser beam 106 and a compressed/pressurized gas from the gas source 110 towards a surface of the article or tube being cut (e.g., to cut the plurality of slots, holes, and/or pores therein in a predetermined pattern along the tube). Directing pressurized gas through the nozzle 112 along with the laser allows for the pressurized gas to push and move any material that is cut from the article. For example, in the case of cutting a metal (e.g., stainless steel) tube, the laser light beam from the delivery nozzle 112 is absorbed by the metal of the tube 135 and the metal thus liquefies. This molten metal may be blown into the inside of the tube 135 by the gas being output from the delivery nozzle 112, or a surrounding environment around the tube.

Figure 2:
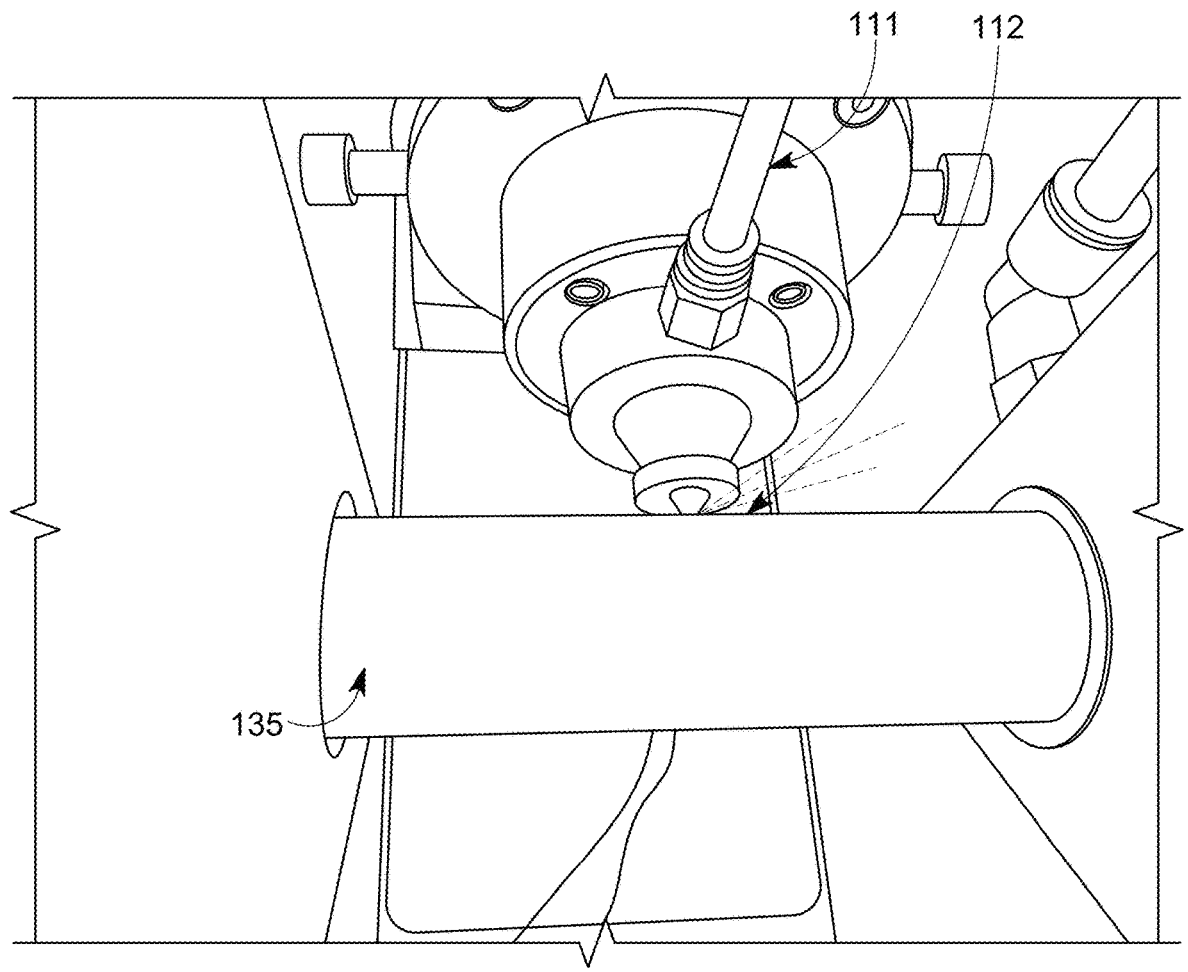
FIG. 2 is a detailed, angled view of part of the laser cutting system of FIG. 1 in operation and cutting an article.

In an embodiment, the gas delivered from the gas source 110 is clean or purified, zero grade air that is dry (e.g., with a dew point around −40 degrees Celsius and less than 0.1 ppm hydrocarbons) and compressible for delivery under high pressure. The gas source 110 may be a tank of air that is connected, e.g., via a hose or piping, to an air nozzle (not shown) that feeds to an infeed side of the delivery nozzle. FIG. 2 illustrates one embodiment showing a gas line 111 that is directed and connected to part of the system that is adjacent to the delivery nozzle 112 in order to deliver gas from the gas source 110 (not shown) thereto. While purified air is a desirable gas for use with the laser, other gases may be used. For example, in another embodiment, the gas from the gas source 110 is a mixture of oxygen and nitrogen. In yet another embodiment, the gas is pure nitrogen (N2) or pure oxygen (O2). In addition to feeding gas (air) to the delivery nozzle 112, the gas source 110 may also supply gas/air to other parts of the system 100. Additional details regarding gas delivery and flow are described later with reference to FIG. 3.

Optionally, a compressor (not shown) may be provided in the system that is associated with the gas source 110 and/or other parts of the system, including, but not limited to, pneumatic parts associated with the system.

As previously mentioned, in accordance with an embodiment, the delivery nozzle 112 may be located above the article or tubing for cutting or slotting. In one embodiment, the delivery nozzle 112 may be mounted to a motion stage 120, or Z stage, that is configured for vertical movement, i.e., upwards and downwards, as indicated by arrow Z. Mounting the delivery nozzle 112 to a vertical motion stage 120 allows for adjustment to the cutting head height and nozzle offset relative to a surface of the article or tube 135 being cut. In accordance with an embodiment, the article is positioned to extend longitudinally in a horizontal direction underneath the delivery nozzle 112. The vertical motion stage 120 may move perpendicularly in a vertical direction relative to a horizontally extending surface of the article or tube. In an embodiment, the motion stage 120 includes a motor (not shown) and a brake system (not shown) for moving and locking the stage in place, e.g., relative to the surface of the tube being cut, when the tube/article is placed in the system. The brake system or lock may be designed to prevent the payload on the Z stage 120 from drifting down when the motor is disabled or otherwise not powered up, according to one embodiment. Movement and locking of the stage 120 may be controlled by controller 118. In another embodiment, a manually adjustable Z stage 120 may be used.

In an embodiment, the focusing objective lens 108 may also be mounted, either directly or indirectly, to the Z stage 120. Accordingly, the Z stage may also move the focusing objective 108 up and down above the tube 135.

Figure 3:
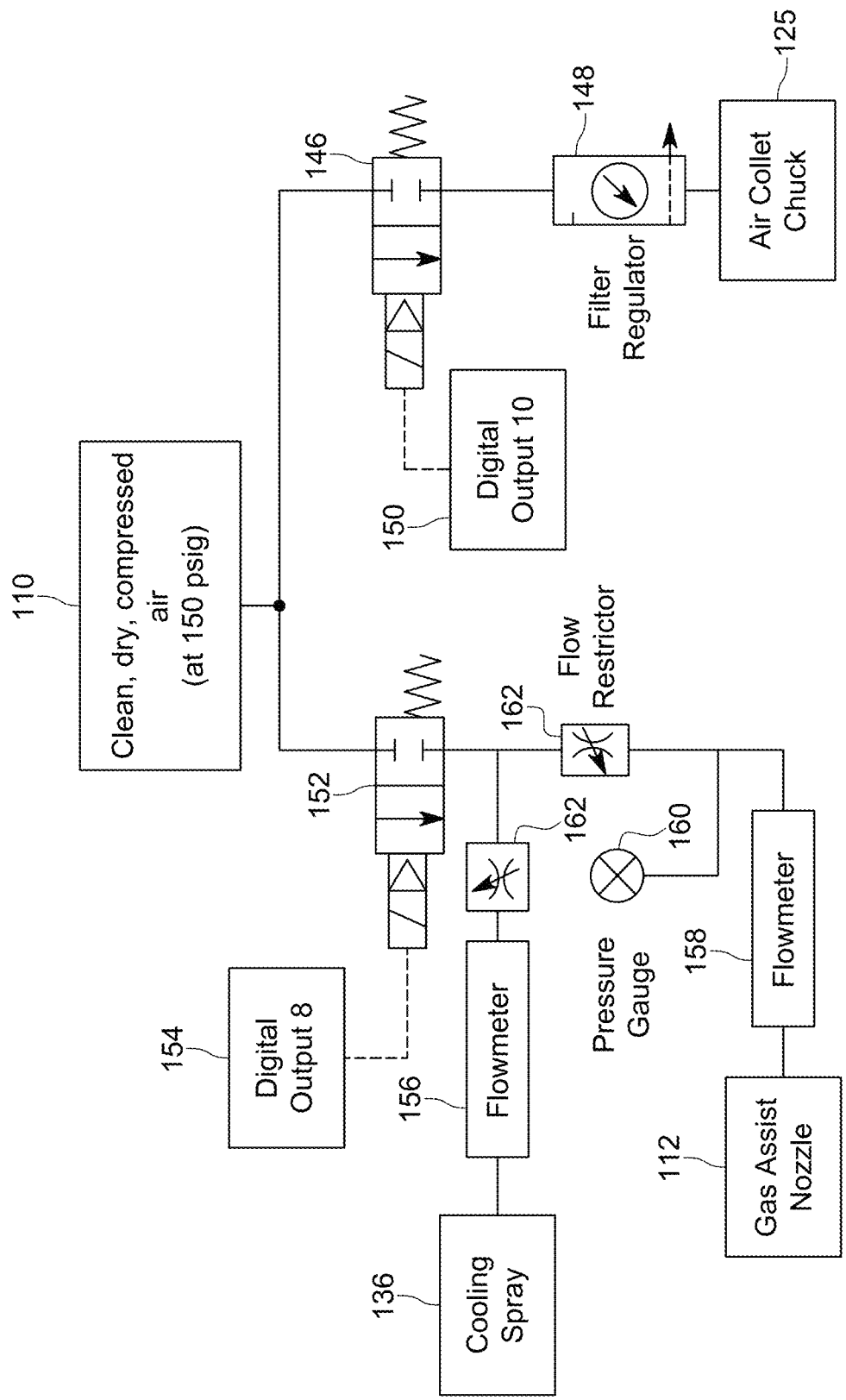
FIG. 3 is a schematic diagram of pneumatic connections that may be provided in the laser cutting system of FIG. 1.

The article or tube may be held and controlled via an article stage 122, which, in one embodiment, may be a combination of linear and rotary stages. As noted above, in an embodiment, the tube 135 may be held such that it extends longitudinally in a horizontal direction (e.g., in the X-direction, along axis A-A) underneath the delivery nozzle 112. The article stage 122 may include a rotary stage 124, or U stage, that is mounted atop a linear motion stage 126, or X stage. Such a configuration allows for simultaneous 2-axis control of tube position, i.e. control over rotation and translation of the tube. The U stage 124 is configured to rotate the article axially—i.e., around or about axis A-A as shown in FIG. 1—during delivery of the gas and laser beam from the delivery nozzle 112, while the X stage 126 may be configured to translate or move the article longitudinally relative to the delivery nozzle 112. That is, X stage 126 may be configured to move the tube horizontally in the X-direction along the axis A-A from one end to the other end, relative to the nozzle 112. In accordance with an embodiment herein, the longitudinal movement of the article or tube in the X-direction may be further assisted by a gripper mechanism (described below with reference to FIGS. 8 and 9). In an embodiment, the U stage 124 includes an integral air collet 125 (schematically represented in FIGS. 1 and 3, shown in FIG. 10) to rotate the article or tube axially, as well as to hold and release the tube.

The system 100 further includes motion amplifiers and/or servo drives (not illustrated) to power and control the stages 124, 126 of the article stage 122 as well the motion stage 120 along all three axes. In an embodiment, direct drive motors and integral encoders may be used with the stage(s) to substantially reduce and/or eliminate any backlash problems. In an embodiment, the linear stage 126 has a maximum speed of approximately 2,000 mm/s and the rotary stage 124 has maximum speed of approximately 600 rpm.

Additional features that may be associated with the stages and/or a frame for the system, e.g., bearings and guide rails, are described later.

The controller 118 controls various part of the system 100, including, for example, actuation of the laser beam from laser source 104 and the gas source 110, and movement of the article stage 122 and the motion stage 120. Other functions of the controller 118 (e.g., controlling coolant) may also be mentioned throughout this description. The controller may be provided in the form of a processor or a personal computer (PC) that has user interface elements, for example. The computer may be a general purpose computer or a special purpose computer. To implement the various parts and their functionalities as described herein, computer hardware and software platforms may be used. The computer may include a central processing unit in the form of one or more processor, for executing program instructions. The controller 118 may include a motion control program programmed or saved therein that is designed to direct the laser beam 106 for cutting the tube 135 while moving (e.g., rotating and horizontally moving) the tube 135 such that the predetermined pattern of slots, holes, and/or pores is cut into the surface of the tube, for example. In an embodiment, a pulse of the beam 106 delivered from the laser source 104 is controlled via controller 118 using pulse synchronization output features, which are part of the motion control program, that triggers a laser pulse at a fixed travel amount on both the linear (X) and rotary (U) axes. For example, in one embodiment, one laser pulse per micron travelled may be output from the laser source 104. Data storage in the form of tangible, non-transitory media, such as memory (RAM or ROM), may be provided, along with a communication bus, in the computer or controller. The method for cutting as disclosed herein may be stored on storage media associated with the controller 118. Tangible non-transitory storage type media include any or all of the memory or other storage for the computer, processor(s) or the like of the herein described system components, or associated modules thereof, which may provide storage for the software programming.

Figure 8:
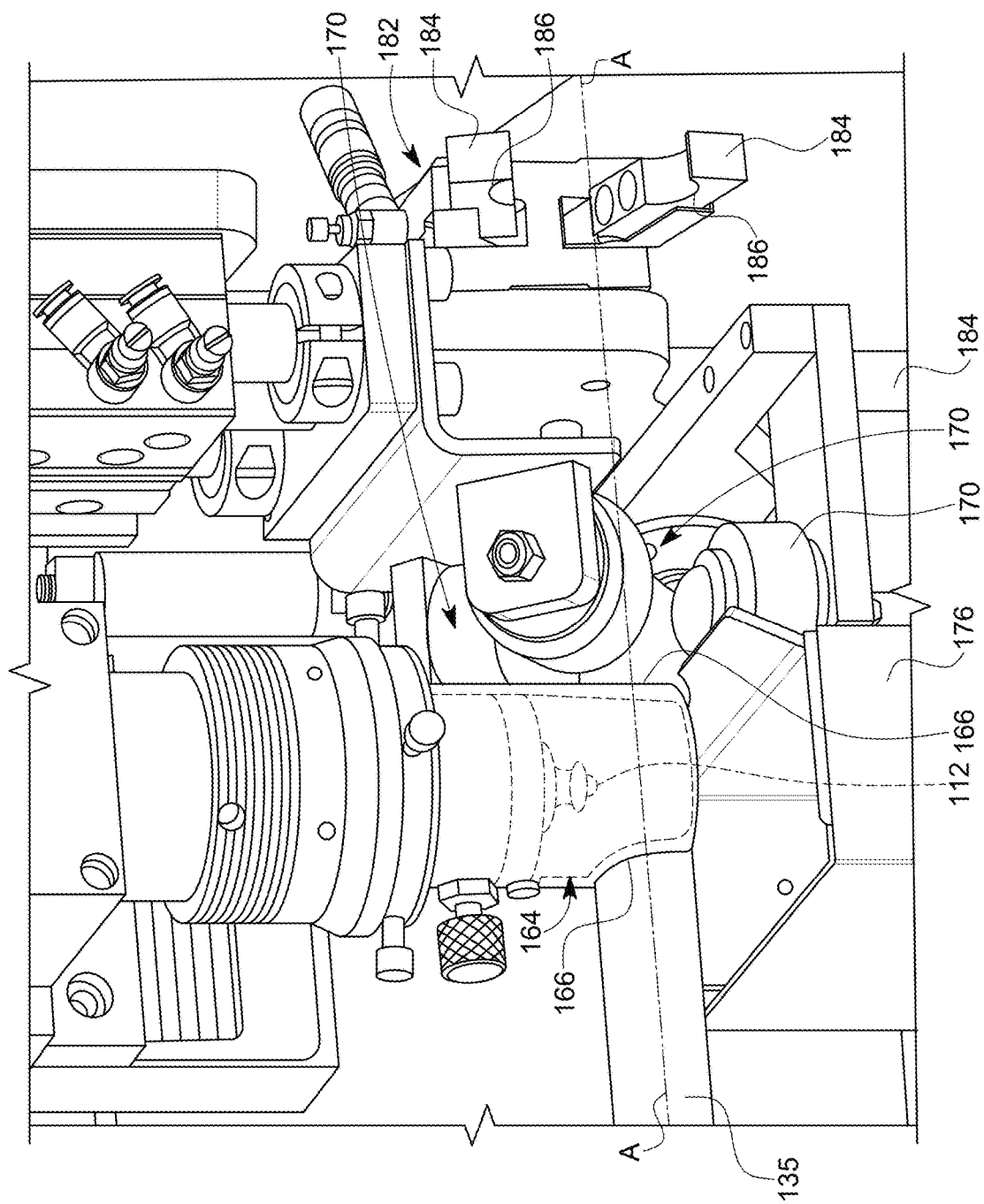
FIG. 8 is a detailed view of parts of the laser cutting system of FIG. 1, in accordance with an embodiment.

In an embodiment, a chuck (not shown) and an alignment component (not shown) may be provided near the delivery nozzle 112. For example, the chuck may be mounted next to the delivery nozzle and may be designed to assist in holding a surface of the tube or article as it is fed and rotated for laser cutting slots, holes, and/or pores therein. The alignment component may be provided adjacent to the delivery nozzle 112 and may be configured to place and hold the article against the chuck, for example. In one embodiment, the alignment component may include a plunger that is spring loaded via spring and may be designed to push the tube vertically upwards to hold the tube in place for cutting. In another embodiment, ball bearings are used to handle the length of the tube/material being cut by the laser. Ball bearings provide smoother handling for higher production speeds. In one embodiment, the alignment component includes one or more sets of ball bearings may be provided to support the tube. In one embodiment, an upper set and a lower set of ball bearings 170 are provided. FIG. 8 illustrates such an example. In an embodiment, the upper set of balls may be immovable and provided on a chuck or similar support surface (such as a bearing support bracket 176, described later below with reference to FIGS. 9A and 9B), while the lower set includes omnidirectional transfer balls. In an embodiment, the lower set may be configured for movement relative to the tube and, in one embodiment, actuated by air cylinders for movement up and down, and towards and away, from the surface of the tube to allow for easy loading and unloading of the tube. Further, use of air cylinders may provide an adjustable clamping force via a compressed air regulator or a compressor (not shown). The upper steel balls may provide a hard stop (e.g., with no clearance) once the lower balls are actuated via the motion program of the controller 118 to move the tube towards the air chuck 125, thereby providing a more accurate vertical positioning of the tube relative to the delivery nozzle 112. The alignment component and/or bearings may be provided on a frame and/or article stage 122 to assist in holding and guiding the tube 135 in the X-direction and U-direction about axis A-A, as well as relative to the delivery nozzle 112.

In an embodiment, to further adjust and focus the laser beam for cutting the article, the delivery system 102 may optionally include a relay lens 128 and a camera 130, schematically shown in FIG. 1. The lens 128 and camera 130 may be positioned above the mirror M2 and vertically aligned with the delivery nozzle 112. In an embodiment, the relay lens 128 and camera 130 may be part of a coaxial video microscope. The camera 130 is configured to take an image of the delivery nozzle 112 to determine placement of the delivery nozzle 112, and thus the laser beam, relative to the tube. In an embodiment, the camera 130 is a CCD video camera. The relay lens 128 is configured to focus the image of the delivery nozzle for the camera 130. The relay lens 128 may be a lens or lens group that is designed for video microscopy and that inverts the image and extends the optical length of the microscope.

In one embodiment, Near Infrared (NIR) neutral density filters (not illustrated) may be added to the video microscope to block some or any of the scattered NIR light. Use of such filters may provide better imaging during the slot cutting process.

Optionally, the system 100 may include a monitoring device 132 for measuring a rate of energy from the laser beam being used to cut the article or tube. As described above, in an embodiment, some or a portion of the energy from the laser beam may pass through the mirror M2 and be absorbed by the monitoring device 132. In one embodiment, the monitoring device is a thermopile power monitor or laser sensor. The thermopile power monitor may be designed to measure an amount of heat generated by the laser, or, alternatively, measure an amount of light being generated by the laser. The monitoring device 132 may be provided it its own housing and placed or mounted in the system 100 relative to the second mirror M2 such that a portion of the laser beam is received.

A coolant containment unit that includes a coolant source 134 (schematically shown in FIG. 1) and a coolant delivery nozzle 136 (schematically shown in FIGS. 1 and 10) may also be optionally provided as part of the laser cutting system 100, in accordance with an embodiment. Coolant from the coolant source 134 may be used to cool the material or surface or portion of the tube (or article) being cut by the laser. The coolant further prevents molten metal from redepositing on an outside of the tube or article. For example, in one embodiment, the coolant delivery nozzle 136 may be positioned to deliver or output coolant to the surface of the tubing during cutting or slotting (see, e.g., schematic of FIG. 1). The coolant delivery nozzle 136 may be positioned adjacent to the delivery nozzle 112, for example. In an embodiment, the outlet of the coolant delivery nozzle 136 may be positioned relative to the surface of the tube or article being cut, e.g., such that the coolant is placed on its surface.

Figure 10:
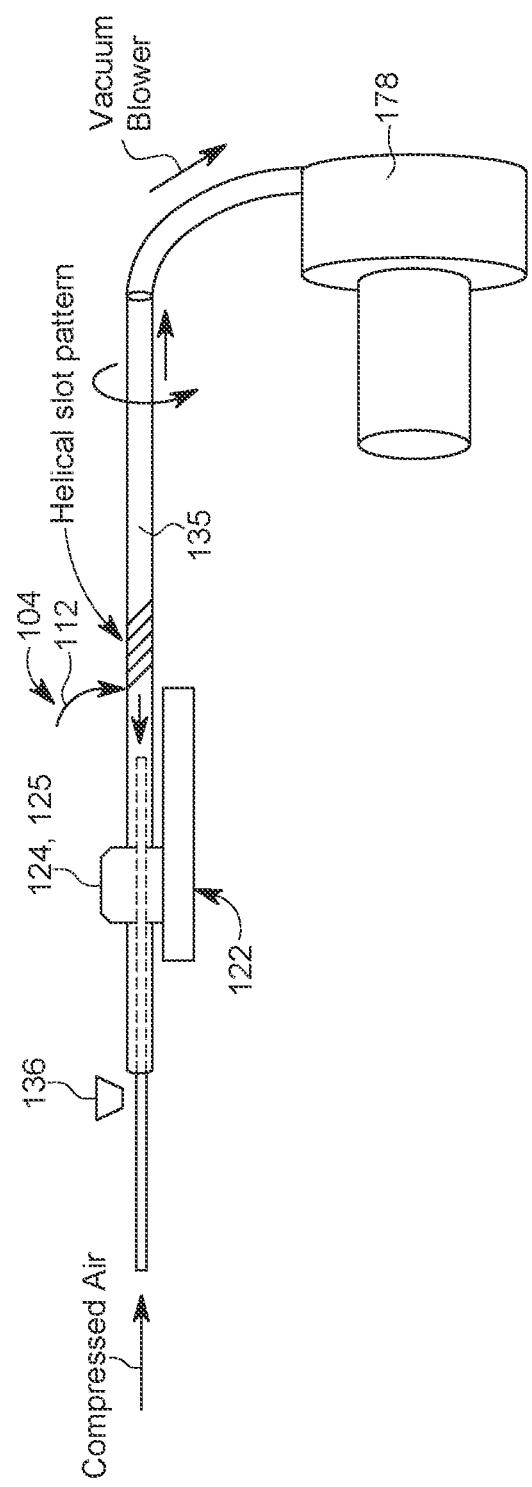
FIG. 10 is a schematic illustration of a vacuum configured for use with the laser cutting system of FIG. 1, in accordance with an embodiment.

In another embodiment, the outlet of coolant delivery nozzle 136 may be optionally positioned relative to a vacuum or air nozzle, such as depicted in FIG. 10. The coolant may be combined with air to form a mixture that is injected into an inside surface of the tubing during cutting or slotting, for example. This may assist in cooling the surface of the tubing that is being cut as well as move and remove any slag material that builds up within the tube during processing/cutting.

In an embodiment, the coolant delivery nozzle 134 is configured to spray the coolant from its outlet. In another embodiment, the coolant delivery nozzle 134 is configured to release the coolant in a stream. In one embodiment, the coolant is water. The ratio of air-to-water or air-to-coolant may vary. For example, zero to one hundred percent water may be combined with air for injection into the tube as shown in FIG. 10.

Coolant (e.g., water) may be collected and contained in the coolant containment area. Further, any slag material that may be removed from the tube during cutting may be gathered and collected in this area, or via vacuum source 178 (which is described below). In one embodiment, the coolant may be filtered and recirculated for re-use, in a closed loop configuration. In another embodiment, the coolant is provided in an open loop configuration. The air/gas and coolant/water process flows enable more consistent laser cuts in the article. As such, the flow of gas may be monitored.

FIG. 3 is a pneumatic schematic diagram illustrating connections to the gas source 110, including delivery of gas to the delivery nozzle 112 (labeled here as gas assist nozzle), coolant delivery nozzle 136, and air collet 125 of the rotary stage 124, and a number of monitoring or sensing devices associated therewith. The gas may be a compressed or pressurized gas, e.g., purified air, that is supplied at a desired pressure (e.g., 150 psig) from the gas source 110 and a compressor. In an embodiment, nDrive amplifiers may be connected to solenoid valves 146, 152 that control the delivery of the compressed air to the delivery nozzle 112, nozzle 136, and the air collet 125. As schematically shown in FIG. 3, gas may be delivered from the source 110, to a compressor (not shown) and/or regulator (not shown), and to the solenoid valve 146 that is connected to the air collet 125. One or more filter regulators 148 may be provided between the valve 146 and collet 125 to regulate the amount of gas supplied to the collet 125. In an embodiment, an assist gas preparation system (not shown) includes a water separator, multiple air filters, and a dehydration membrane. The assist gas preparation system may be used to produce clean dry air that is needed for the assist gas in the delivery nozzle 112. The solenoid valve 152 also may be used to regulate gas flow to the nozzles 112 and 136. Digital outputs 150 and 154 from a power supply are connected to the solenoid valves 146 and 152, respectively, to drive the solenoids. A pressure switch (not shown) may be provided and connected to one or both solenoids 146, 152 to assist in controlling pressure and protect the laser in case pressure drops. The air/gas may then be delivered to the delivery nozzle 112. In an embodiment, the delivery nozzle 112 has a 0-60 standard cubic feet per hour (scfh) flow meter 158 and 0-100 pounds per square inch (psig) pressure gauge 160 associated therewith. The "g" at the end of the psig designates "gauge pressure", or pressure above atmospheric, as opposed to absolute pressure. The spray or output via outlet of coolant delivery nozzle 136 may be generated from mixing compressed air from the gas source 110 and coolant (water) from the coolant source 134. Accordingly, with compressed air being provided at around a pressure of 150 pisg, a 0-30 scfh flow meter 156 may be used to measure the flow to the nozzle 136. In an embodiment, flow restrictors 162 may be used in combination with the flowmeters 156, 158 associated with the nozzles 112, 136, in order to further restrict or gauge the flow of compressed gas/air thereto. The measurement of the coolant flow to the coolant delivery nozzle 136 may be provided by an IV drip chamber (not shown).

The general operation of the system 100 of FIG. 1 is, as follows: The tube or article is placed in or on article stage 122. As needed, the delivery nozzle 112 is moved via the motion stage 120 relative to the surface of the tube, and the stage 120 is locked. The laser is triggered within the motion program of the controller 118. The controller 118 also delivers the gas from the gas source 110 through the nozzle 112 along with the laser, to thereby cut slots, holes, and/or pores therein in a predetermined pattern along the tube. During delivery of the laser beam, the controller 118 controls movement of the article such that the article is continuously rotated axially about and moved linearly or longitudinally along the longitudinal axis (A-A) using the article stage 122, i.e., moved in the U- and X-directions.

Figure 4:
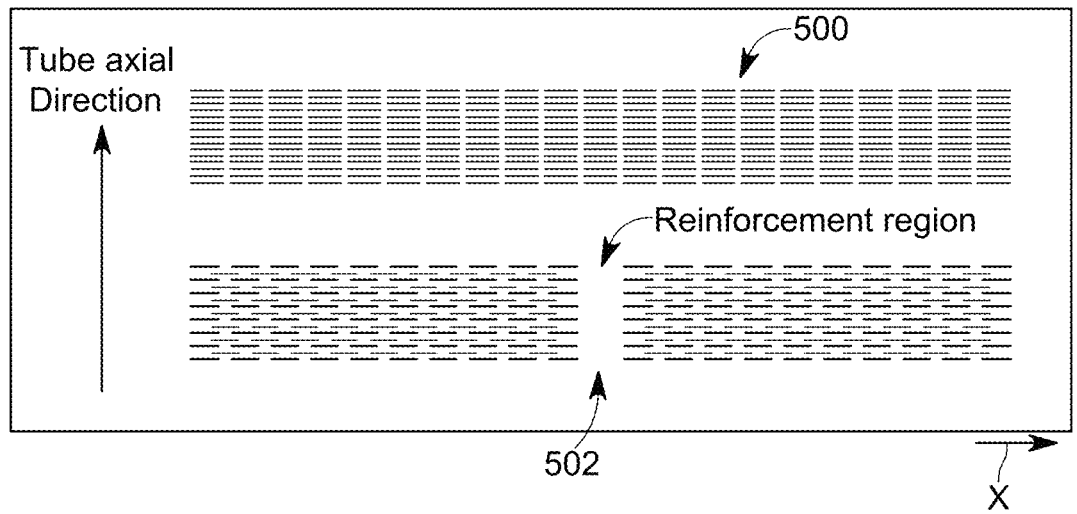
FIG. 4 illustrates examples of patterns that may be cut into articles or tubes, in accordance with an embodiment.

In accordance with an embodiment, the method for cutting slots in a predetermined pattern in articles or tubes includes cutting the slots in a helical motion pattern or scheme. FIG. 4 illustrates examples of slot patterns 500 and 502 that may be cut into articles or tubes, in accordance with an embodiment. In one embodiment, such as shown here, the slots are cut at a 90 degree angle relative to the axial direction of the tube (i.e., 90 degrees relative to axis A-A, in the X-direction). As described above, the slots may be cut in one continuous helix around the tube circumference by moving the article or tube continuously via rotating it (spiraling) and moving it linearly or longitudinally relative to the delivery source 102/laser (e.g., in one direction) as the laser pulses and cuts slots, holes, pores into and through its surface. The tube movement in the longitudinal direction or X-direction is generally in one direction along the axis A-A. For example, referring to the illustrative embodiment shown in FIG. 9A, the longitudinal movement of the tube 135 is from left to right, relative to the delivery source 102. Similarly, the concurrent axial or rotational movement of the tube or U-direction may also be in one direction, i.e., clockwise or counter-clockwise, about axis A-A. Despite the direction of rotational and longitudinal movements, the tube is moved in these direction simultaneously and continuously as the laser is pulsed and directed to cut the slots, holes, and/or pores in the predefined or predetermined pattern (controlled by the controller), thereby resulting in the aforesaid "helical motion" for cutting.

Figure 5:
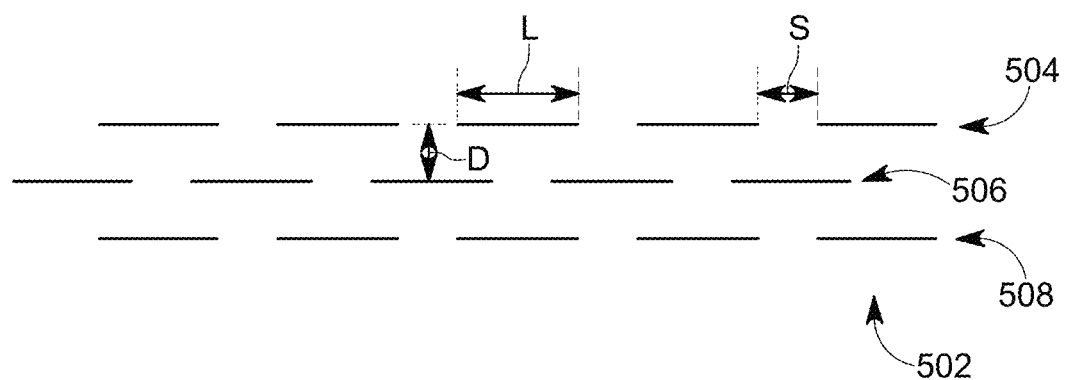
FIG. 5 illustrates a detailed view of an exemplary layout of slots, holes, or pores cut into articles or tubes, in accordance with an embodiment.

The slot patterns 500 and 502 of FIG. 4 are two-dimensional representations of patterns that may be cut into tubes or articles using the above-described helical motion scheme. The slot pattern 500 shows an example wherein slots may be provided in axially parallel rows, with longitudinal spacing between each row. In the pattern 502, slots may be cut into the article such that the resulting pattern includes adjacent rows and slots that are offset from one another. FIG. 5 illustrates a detailed view of portion of such rows in the pattern 502. Each row 504, 506, and 508 of cut slots includes slots that have a length L in the longitudinal direction. A longitudinal space S is provided between each of the slots in the same row. Adjacent rows are spaced by a distance D therebetween in the axial direction, e.g., row 506 is spaced a distance D from row 504, row 508 is spaced distance D from row 506, etc. Additionally, the adjacent rows are axially offset from one another, i.e., row 506 is offset relative to row 504, and row 508 is offset relative to row 506. In one embodiment, alternate rows—like rows 504 and 508—may be similar. The offset for adjacent rows may vary. In one embodiment, a second row (e.g., row 506) is offset from a first row (e.g., row 504) by approximately fifty percent (50%) in the axial direction. In another embodiment, adjacent rows may be offset by approximately twenty five percent (25%). A reinforcement region may also be provided between groups or sets of slots as shown by pattern 502. Such a reinforcement region is formed by moving the tube longitudinally such that there is a space between a set of slots.

Figure 6:
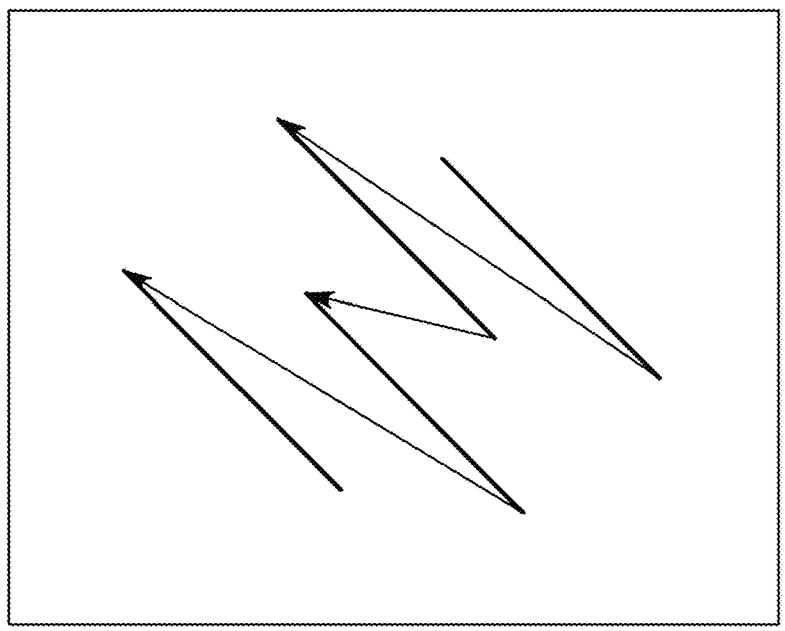
FIGS. 6 and 7 illustrate alternate examples of patterns for cutting into articles or tubes, in accordance with alternate embodiments.
Figure 7:
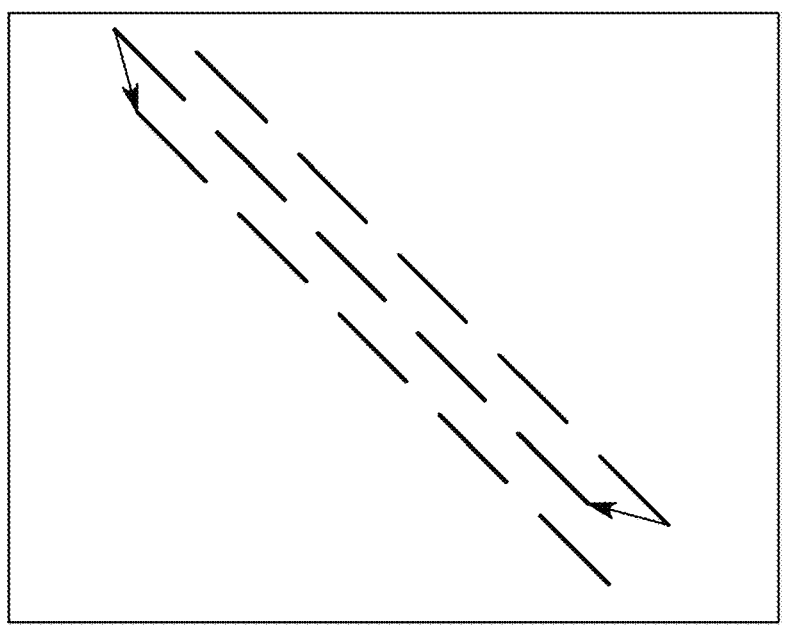

FIGS. 6 and 7 show alternate methods of cutting slots, holes, and/or pores into an article or tube. In one embodiment, depicted in FIG. 6, the method includes a motion scheme that includes cutting a single length slot, then rotating the tube (in the U-direction) to the next radial position for cutting a slot on the tube, cutting the slot, and repeating. Generally this scheme requires translational (i.e., back and forth) movement of the tube along axis A-A between each rotation. That is, a slot is cut, the tube is moved longitudinally (in the X-direction) then rotated (or vice versa, i.e., rotated then moved longitudinally), and the next slot is cut, then moved longitudinally and then rotated, etc.

In another embodiment, the method includes a motion scheme that includes a single movement in the longitudinal direction while cutting multiple slots per row, before rotation. For example, as illustrated in FIG. 7, the tube may be moved, without rotating it, in the longitudinal direction (in the X-direction), so that the laser of the delivery system 102 cuts a first row of slots. Then, after the first row is completed, the tube may be rotated (in the U-direction) to the next radial position and held at that rotated position. Then, a second row of slots may be cut into the tube by moving the tube longitudinally, and then rotating again, such that the process repeated until all rows are cut.

In one embodiment, the slots may be cut such that their length L extends at a zero degree angle relative to the tube axis A-A. In another embodiment, such as illustrated in FIG. 5, the slots may be cut at 90 degrees relative to the tube axis A-A, despite the cutting scheme. In another embodiment, such as illustrated in FIGS. 6 and 7, no matter what the motion or cutting scheme, slots may be cut on a 45 degree angle from the tube axis A-A, i.e., resulting in positioning of their length at a 45 degree angle relative to the axis A-A. Of course, such angles and positions are illustrative only and not intended to be limiting. It should be understood that other angles for cutting and/or positioning a length L of the slots may be implemented, e.g., 30 degrees, 60 degrees, 75 degrees, etc.

Further understanding regarding the relative motion of the stages, laser, and tubing may be further evident via the description provided with reference to FIGS. 8-10.

In an embodiment, the system 100 may be designed to cut slots, holes, and/or pores into and through a surface of tubes, to form filtration tubes. The types and dimensions of tubes that may be processed and cut by the system 100 are not limited. For example, the outer diameter (OD) and/or inner diameter (ID) of the tubes being cut may vary. In an embodiment, tubes may have a 9.5 mm diameter (OD). In another embodiment, the tubes may have an 25.4 mm diameter (OD). Further, the wall thickness of the tubes being cut by the system 100 need not be limited. The system 100 may cut or slot tubes having 0.25 mm wall thickness, 0.3 mm wall thickness, and/or 0.4 mm wall thickness, for example. The length of the tubes being slotted may vary, e.g., 1.1 meters long, 1.64 meters (1640 mm) long, etc.

The dimensions (e.g., width and length) of the slots, holes, and/or pores cut into the tubes is not intended to be limiting. In an embodiment, the system 100 may be used to cut slots, holes, and/or pores having a width in the range of approximately 10 micrometers to approximately 50 micrometers. In another embodiment, the slots, holes, and/or pores may have a width in the range of approximately 30 micrometers to approximately 50 micrometers. Such ranges are examples only and should not limit the dimensions of the cuts in any way.

The overall porosity of the tubes may be between approximately fifteen percent to approximately 20 percent, after being laser cut, in accordance with an embodient.

In an embodiment, the tubes are made of stainless steel (SS) material with a fully annealed temper. In one embodiment, the tubes are made of 321 grade SS. In another embodiment, the tubes are made of 304 grade SS.

In an embodiment, the machine may be designed to produce 1-1.64 meter lengths of micro-slotted tubes, with a target porosity of 15%, in less than 1 hour. In one embodiment, the system 100 is configured to cut tubes such that they have a porosity range between approximately 1% and approximately 50% (both inclusive), a slot/hole/pore length in a range of approximately 0.1 mm and approximately 10 mm (both inclusive), and a slot/hole/pore width in range of approximately 1 micron and approximately 1000 micron (both inclusive). In another embodiment, the porosity range for tubes cut by the system 100 may be between approximately 5% to approximately 25%, with a slot length between approximately 0.5 mm to approximately 3.0 mm, and a slot width between approximately 10 microns to approximately 100 microns. The tubes may include microslots, holes and/or pores with approximate dimensions of approximately 30 micrometers to approximately 50 micrometers wide and approximately 1 mm long. The lengths of the tubes to be cut and processed in the system may vary.

Slot length(s), angle(s), and position(s) may be precomputed and converted into servo-encoder counts. Those encoder counts are used to build an array mask for laser emission. During motion, the mask array is used to stop laser emission when the laser is inside an encoder exclusion region. Conversely the laser is allowed to fire/emit when not in those regions. When inside the firing regions the laser is either modulated or CW depending on the desired cutting process. To ensure consistent cutting at the beginning and end of the firing sequence a longer no fire region is left for acceleration and deceleration.

Referring back to parts of the system 100, FIG. 8 shows, in one embodiment, a stabilizer tube, cutting nozzle cover, or shroud 164 may optionally be provided in the area around a tip of the delivery nozzle 112, e.g., to collect any water or coolant and slag material that is released during slotting or cutting, and cover and deflect debris away from other hardware. The shroud 164 may block most if not all of the debris produced during the slotting/cutting process and substantially prevent the debris from making its way to guide ball bearings, stages 124 and 126, and surrounding parts that hold the tube, further protecting them from damage. FIG. 8 illustrates one embodiment of the shroud 164 in the form of a cylinder that extends vertically and downward from part of the delivery system 102. The cylinder may be positioned around the delivery nozzle 112. Further, the shroud 164 may include one or more cut-out portions 166 configured to accommodate a shape of the tube 135 or article being cut. In the exemplary illustrated embodiment of FIG. 8, two cut-out portions 166 are provided in the cylinder of the shroud 164 to accommodate a longitudinal length or extent of the tube 135. In an embodiment, each cut-out portion 166 may be curved and sized such that it accommodates the curvature of the outside surface of the tube 135 therein, for placement adjacent or on the surface of the tube 135.

Any collected coolant and/or slag material may be periodically removed from the shroud 164 and/or inside of the tube 135, as needed. Alternatively, shroud 164 may not be provided.

Figure 9A:
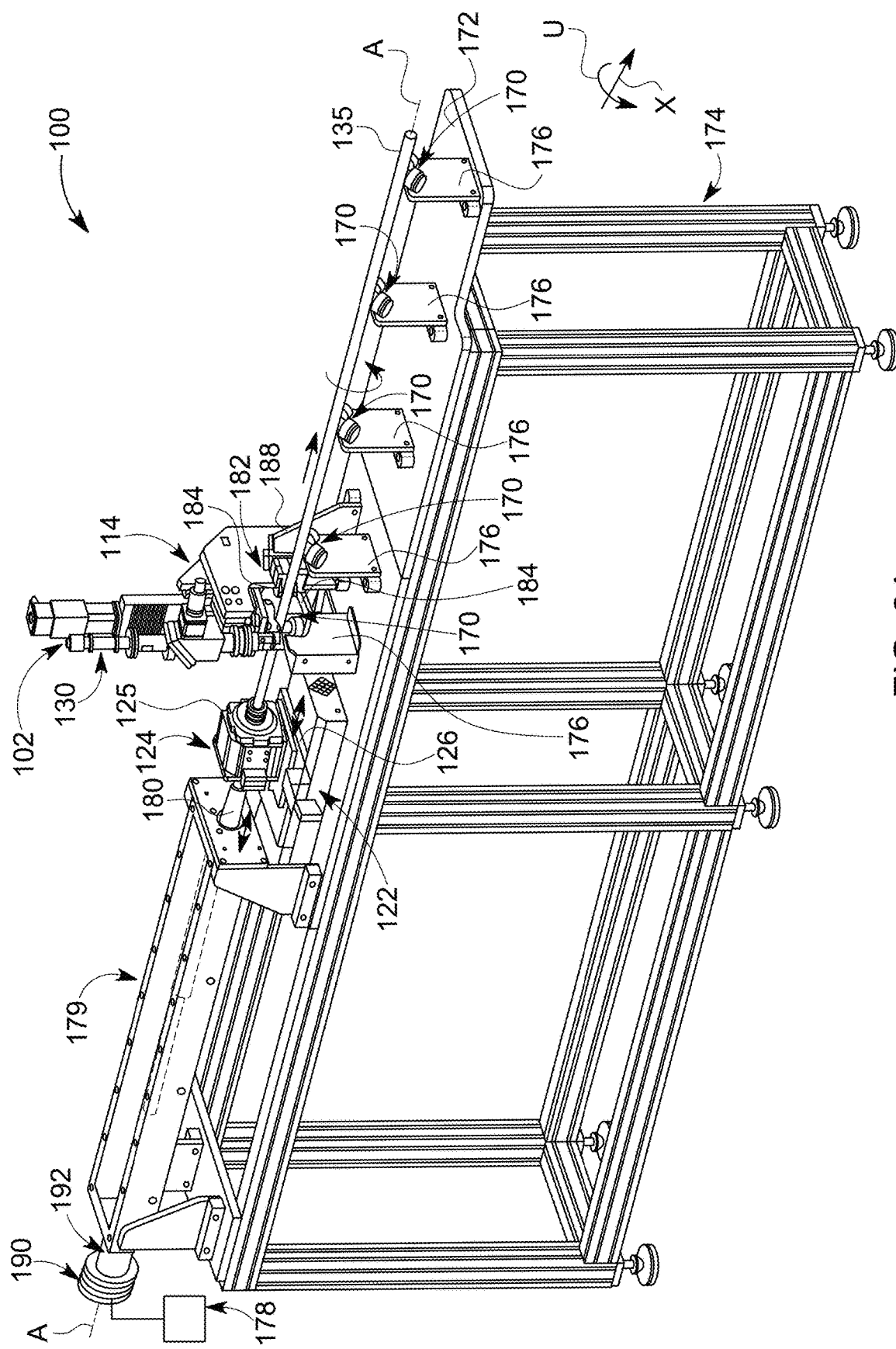
FIG. 9A is an isometric view of a laser cutting system provided on a frame in accordance with an embodiment.

In accordance with an embodiment, the tube 135 may be guided in the X-direction and U-direction about axis A-A by one or more air bearings (not shown) which may be in line with the rotary stage 124 and located on either side of the delivery nozzle 112. In another embodiment, as described above and shown in FIG. 8, an alignment component that includes one or more sets of ball bearings 170 (e.g., upper and lower sets) may be provided adjacent to the delivery nozzle 112 to support the tube. As also mentioned previously, in one embodiment, bushings and/or ball bearings may be provided to support a length of the tube when placed in the system 100 and as it is cut via laser source 104. For example, one or more sets of ball bearings, shown in FIGS. 8 and 9A-9B, may be provided on a frame and/or article stage 122 to assist in holding and guiding the tube 135 in the X-direction and U-direction about axis A-A. More specifically, in the embodiment as shown in FIG. 9A, the laser cutting system 100 may be positioned on a table surface 172 mounted to a frame 174. Spaced along the table surface 172 may be a number of tube bearing support brackets 176 that extend vertically upward from its horizontal surface. Each bearing support bracket 176 may include a set of omnidirectional transfer balls 170 provided at an angle to support a surface of the tube and to guide the tube in the vicinity of the laser head. In an embodiment, at least some of the brackets 176 include balls that are angled towards each other. In another embodiment, the balls 170 may be positioned substantially vertically to support the tube surface from below. In one example, infeed and outfeed brackets 176 may be provided to support the tube where it extends beyond the article stage 122.

The bearing support brackets 176 act as guide tracks for guiding movement of the tube in the longitudinal direction (in the X-direction) as well as rotationally about axis A-A (in the U direction) as the laser cutting system 100 is delivered at a pulsing rate for cutting the slots, holes, and pores into the surface of the tube 135. These guide tracks/brackets 176 also support the weight and length of the tube once it extends beyond the tube handing region (i.e., the region adjacent to the stages and below/beyond the delivery nozzle of the laser source). Because bending of the tube can affect a position of the tube in relation to the delivery nozzle 112, which can result in moving the tube surface out of focus with the laser beam, providing such guide tracks may further assist in reducing errors and thereby increase quality of the cuts and slots.

In one embodiment, the transfer balls 170 may be sealed and thus may not be susceptible to damage from any slag.

Figure 9B:
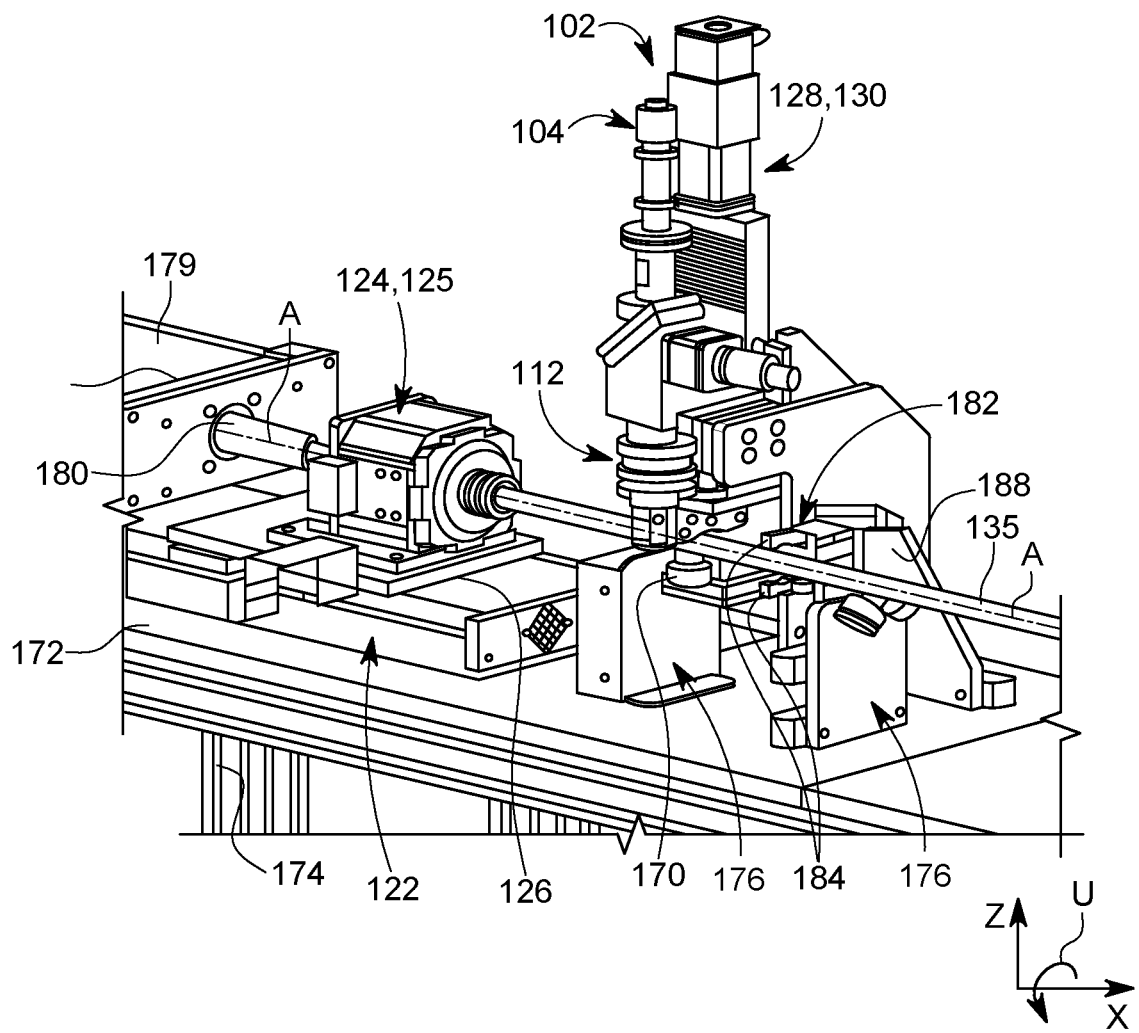
FIG. 9B is a detailed view of parts of the laser cutting system of FIG. 9A.

FIG. 8 additionally shows a robotic, mechanical gripper mechanism 182 that may be used with laser system 100. Gripper mechanism 182 may be controlled by controller 118 and designed to hold or grip tube 135, move the tube 135, and/or, in some instances, act as a guide during rotation of the tube 135. The gripper mechanism 182 may include two finger portions 184—e.g., an upper finger portion and a lower finger portions—each having a cut-out portion 186 therein for accommodating the tube (or article). For example, the cut-out portions 186 may be circular or rounded to accommodate the outer surface of a tube 135. As generally understood by those of skill in the art, such a gripper mechanism is designed so that its finger portions 184 move relative to one another between an open position (shown in FIG. 8 and FIG. 9B) and a closed position (wherein the finger portions 184 are moved closer towards each other to grip around an article, or, in this case, tube). Accordingly, such details are not described here. As shown in FIGS. 9A and 9B, the gripper mechanism 182 may be mounted to the table 172 via bracket 188.

The gripper mechanism 182 is designed to work with the air collet 125 of the rotary stage 124 (and optionally, the linear stage 126) to linearly move and rotate the tube 135 as it is cut by the laser source 104 using a motion scheme. In an embodiment, the gripper mechanism 182 is designed to longitudinally move the tube in the X-direction while the air collet 125/rotary stage 124 rotates the tube about the axis A-A in the U-direction, during pulsing/cutting via laser source 104.

Since the delivery nozzle 112 is designed to blow gas and thus move cut and/or molten material from the tube 135, e.g., into an inside wall of the tube 135 itself, some slag may build up therein. To prevent this slag from building up on inside of the tube wall, in one embodiment, a vacuum source 178 or blower for providing a vacuum force to an end of the tube 135 may be provided. For example, as shown in FIG. 10, in one embodiment, the vacuum source 178 may be provided on an outfeed side of the system. In another embodiment, as shown in FIG. 9, the vacuum source 178 is provided on an infeed side (i.e., one the same side as the stages) of the system. The application of a vacuum may assist in removing slag and/or coolant and/or air-coolant mixture from the cutting zone and tube as the laser is cutting the tube. The vacuum may include a self-cleaning filter which allows for continuous operation of the slotting machine without having to change the filters after every tube. The self-cleaning filter may also assist in resolving issues relating to clogging by the volume of slag that is generated.

In another embodiment, a pressurized blower port and a vacuum suction port may be provided in the system 100. For example, as illustrated in FIG. 10, compressed or pressurized air may be introduced into the tube at a first end via a blower port, and a vacuum force via a vacuum suction port from source 178 may be provided at an opposite end.

In one embodiment, an immersion separator may be used as part of a slag conveying process. Such an immersion separator may use liquid (e.g., water) to separate and remove slag from a stream (air, water, or a mixture thereof) before it enters the blower or vacuum.

Referring back to FIG. 9A, shown is an example of using a vacuum source 178 connected to a vacuum box 179 on the infeed side of the system, in accordance with an embodiment, for removing slag from the cutting zone. More specifically, in this illustrative example, the vacuum box 179 is provided on the left side of the delivery system 102 and table surface 172. The vacuum box 179 is connected to the vacuum source 178 via a connector 192 and hose 190. The positioning of the vacuum on this side allows for the withdrawal of slag from the tube through a back side or side that has not yet been cut. This vacuum box 178 further aids in maintaining vacuum over the entire length of the tube during the cutting operation, which will help more effectively remove slag when cutting. Slag is conveyed from the cutting nozzle 112, through the (inside of) tube 135, through the vacuum box 179, out through the hose 190 and to the vacuum 178.

The vacuum box 179 is a vacuum sealed device that includes a vacuum sealed internal chamber and an adapter 180 between its exit and the rotary stage 124/air collet 125. The adapter 180 may be provided in the form of a tube that is larger than and surrounds tube 135, for example. The adapter 180 maintains the vacuum seal between the chamber of the box and the tube 135 as it is moved and rotated during cutting. The adapter 180 may be configured to move through the chamber of the vacuum box 179, e.g., along with the tube 135. For example, when preparing a tube 135 for cutting, a majority of the length of tube 135 may be inserted through the adapter 180 and into the chamber of the vacuum box 179. Once set (e.g., motion stage 120 and setting and locking of the delivery system 102), the vacuum source 178 may be activated to provide the vacuum seal and vacuum to the inside of the tube 135. As the article stage 122 is moved longitudinally in the X-direction, the adapter 180 and tube 135 may also move longitudinally, out of the chamber. The movement of the adapter 180 may be defined by its length, and the tube 135 may continue moving out of the chamber and adapter in the X-direction. The vacuum box 179 and its internal chamber may have a length (e.g., over 1 meter), extending behind the delivery nozzle 112 of the laser source 104, to allow for housing and accommodating most of, if not full, length of the tube to be slotted, for example. In one embodiment, the length of the box 179 is approximately twice the size of a length of the tube 135.

One or more sensors may be associated with the vacuum box 179. For example, in one embodiment, the vacuum box 179 has a pressure sensor (not shown) associated therewith, to give feedback and allow an operator and/or system/controller to know the pressure in the vacuum box.

The connection size or diameter of the hose 190 connected to the box 179 may be based on the desired amount of air flow down the tube, and is not intended to be limiting. The hose connection or diameter between the vacuum 178 and the vacuum box 179 may be in the range of approximately 30 mm to approximately 80 mm, inclusive, in accordance with one embodiment.

Figure 11:
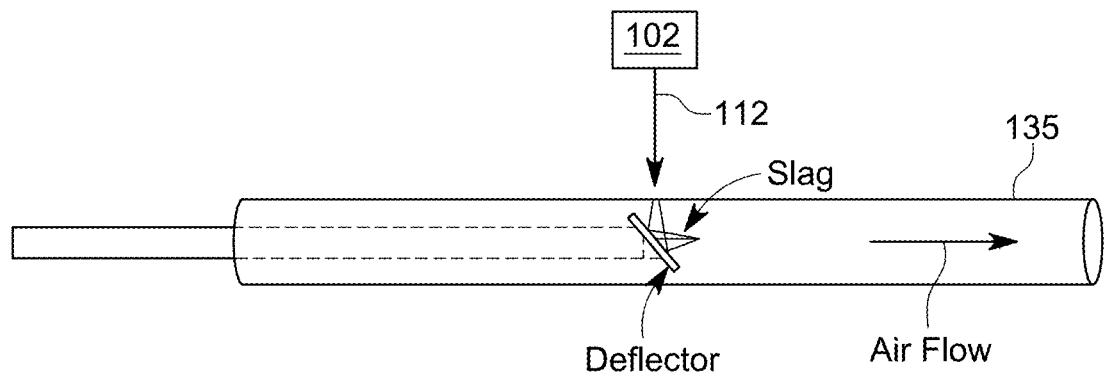
FIGS. 11 and 12 illustrate schematic drawings of exemplary slag catcher devices that may be used with the laser cutting system of FIG. 1, in accordance with embodiments.
Figure 12:
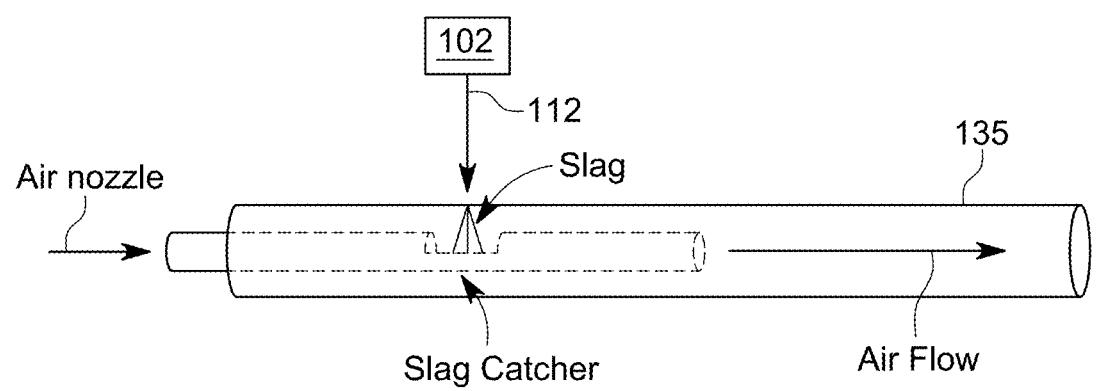

Other devices may be used along with the laser system 100. For example, in one embodiment, a slag catcher device may be provided in the laser system 100, used along with a blower or vacuum 178, for example. FIGS. 11 and 12 illustrate exemplary slag catcher devices that may be used with the laser cutting system of FIG. 1, in accordance with embodiments. FIG. 11 illustrates a concept wherein a physical deflector is added inside of the tube (135) being laser cut. The added deflector may physically block or deflect slag and mitigate slag re-deposition issues. In some cases, the deflector may redirect or slow a velocity of the slag stream as it enters the inside of the tube. In FIG. 11, the deflector is provided at a 45 degree angle, such that any slag that hits the deflector may be deflected approximately 90 degrees to be in line with airflow through and out of the tube, such that the slag is also pulled and carried out of the tube via vacuum source 178. FIG. 12 illustrates an alternative configuration for catching slag stream (rather than deflecting it). In this configuration, an internal slag catcher in the form of a tube is inserted into the tube (135) being laser cut. The catcher has a catching area for catching slag resulting from the cutting via the laser. An air nozzle (blower or vacuum 178) may be streamed inside of the internal slag catcher to push any slag down the slag catcher tube and into the air stream/airflow through and out of both tubes.

In another embodiment, a spark catching device may be provided adjacent to or inserted into the tube 135 to collect any cut metal. The slag deposits collecting in the spark catching device may be monitored and periodically disposed of before the slag interferes with the cutting process.

In an embodiment, the laser cutting system 100 may be part of a production system that includes a robotic arm that is configured to move a tube for processing between a number of subsystems, including laser cutting system 100. In one embodiment, each subsystem is designed to complete its function in approximately one hour or less, and without holding up production for the slotting subsystem/laser cutting system 100. In an embodiment, each tube undergoes pre-inspection wherein unprocessed and uncut tubes are inspected before laser cutting with system 100. The laser cutting system 100 is configured to receive each tube that has passed pre-inspection via the robotic arm moving said tube from the inspection system to the laser cutting system 100.

In an embodiment, the production system is a system that is described in U.S. Patent Application Ser. No. 62/738,919, titled "PRODUCTION SYSTEM FOR FORMING FILTRATION TUBES INCLUDING SUBSYSTEMS AND METHOD OF USING SAME," filed on the same day, and assigned to the same assignee herein, which is hereby incorporated by reference in its entirety.

As noted, the articles or tubes being cut or slotted by the herein disclosed system 100 may be used to form filtration tubes. Such filtration tubes may be used as part of filtration bundles and or assemblies, e.g., assembled or arranged in a packs or other configurations to meet specific filtration requirements for any number of industries. Generally, such assemblies may be used to filter solids from liquids in one direction, and, when necessary, backwashed in an opposite direction to remove embedded particles or cake in the holes to clean such filtration media.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, one of ordinary skill in the art will understand that the controller 118 may be used to control any number of parts of the laser system 100 (e.g., pulsing of the laser, air collet 125, stages 120, 122, lens 108, 128, gas/air/water sources, etc.), even if not explicitly mentioned herein.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A laser cutting system for cutting articles, the laser cutting system being configured to cut a plurality of slots, holes, and/or pores into each article, the system comprising:
   a delivery system for delivering a laser beam, the delivery system comprising a laser source configured to provide a laser beam, at least one mirror, a focusing objective lens, a gas source, and a delivery nozzle;
   the delivery nozzle configured to deliver gas from the gas source and the laser beam from the laser source towards the article to cut the plurality of slots, holes, and/or pores therein in a predetermined pattern along the article, the article being configured to extend in a longitudinal direction along a longitudinal axis relative to the delivery nozzle;
   a first stage for holding each article to be cut by the laser beam and being configured to (a) rotate the article axially about the longitudinal axis during delivery of the gas and laser beam towards the article and also (b) move the article longitudinally in the longitudinal direction along the longitudinal axis relative to the delivery nozzle as the laser beam is delivered to the article in order to cut the plurality of slots, holes, and/or pores into the article;
   a second stage for moving the delivery nozzle relative to the article being held by the first stage, the second stage being configured for movement perpendicularly relative to the longitudinal direction of the article;
   a controller for controlling actuation of the laser beam and the gas source, and movement of the first stage and the second stage, and
   a vacuum source for providing a vacuum seal and vacuum to an inside of the article and for withdrawing slag cut from the article through the inside thereof during cutting by the laser beam.

2. The laser cutting system according to claim 1, wherein the article is a tube, the laser cutting system being configured to cut a plurality of slots, holes, and/or pores into and through a wall of each tube to form a filtration tube that is configured to filter solids from fluids.

3. The laser cutting system according to claim 1, wherein the first stage comprises a first substage and a second substage, the first substage configured to rotate the article axially about the longitudinal axis and the second substage configured to move the article longitudinally along the longitudinal axis, wherein the first substage is positioned atop the second substage.

4. The laser cutting system according to claim 1, wherein the at least one mirror of the delivery system comprises a first mirror and a second mirror, both of the first mirror and the second mirror being configured for rotation via a rotatable mount for directing the laser beam.

5. The laser cutting system according to claim 1, further comprising a camera and a relay lens, wherein the camera is configured to take an image of the delivery nozzle to determine placement of the delivery nozzle, and thus the laser beam, relative to the article, and wherein the relay lens is configured to focus the image of the delivery nozzle for the camera.

6. The laser cutting system according to claim 1, further comprising a monitoring device for measuring a rate of energy from the laser beam being used to cut the article.

7. The laser cutting system according to claim 1, further comprising a coolant containment unit comprising a coolant source and a coolant delivery nozzle, the coolant delivery nozzle being positioned adjacent to the delivery nozzle, and wherein the coolant delivery nozzle is configured to deliver coolant towards the article during cutting thereof.

8. The laser cutting system according to claim 1, further comprising guide tracks and ball bearings for guiding movement of the article in the longitudinal direction.

9. The laser cutting system according to claim 1, the controller is configured to control the movement of the first stage relative to the laser beam such that the article comprises a plurality of rows of slots, holes, and/or pores therein, and wherein adjacent rows are offset from one another after cutting.

10. A method for cutting a plurality of slots, holes, and/or pores into articles using a laser cutting system, the laser cutting system comprising: a delivery system for delivering a laser beam, the delivery system comprising a laser source configured to provide a laser beam, at least one mirror, a focusing objective lens, a gas source, and a delivery nozzle, the delivery nozzle configured to deliver gas from the gas source and the laser beam from the laser source towards the article to cut the plurality of slots, holes, and/or pores therein in a predetermined pattern along the article, the article being configured to extend in a longitudinal direction along a longitudinal axis relative to the delivery nozzle, a first stage for holding each article to be cut by the laser beam and being configured to (a) rotate the article axially about the longitudinal axis during delivery of the gas and laser beam towards the article and (b) move the article longitudinally in the longitudinal direction along the longitudinal axis relative to the delivery nozzle as the laser beam is delivered to the article in order to cut the plurality of slots, holes, and/or pores into the article, a second stage for moving the delivery nozzle relative to the article being held by the first stage, the second stage being configured for movement perpendicularly relative to the longitudinal direction of the article, a controller for controlling actuation of the laser beam and the gas source, and movement of the first stage and the second stage, and a vacuum source for providing a vacuum seal and vacuum to an inside of the article and for withdrawing slag cut from the article through the inside thereof during cutting by the laser beam; wherein the method comprises:
   placing the article in the first stage;
   moving the delivery nozzle relative to the article using the second stage;
   controlling the controller to deliver the laser beam and the gas towards the article to thereby cut the plurality of slots, holes, and/or pores therein in the predetermined pattern along the article; and
   withdrawing the slag cut from the article through the inside thereof via the vacuum source,
   wherein, during delivery of the laser beam, the controller controls movement of the article such that the article is continuously rotated axially about the longitudinal axis and moved longitudinally along the longitudinal axis using the first stage.

11. The method according to claim 10, wherein the axial rotation and longitudinal movement of the article during delivery of the laser beam results in cutting a helical cutting pattern of slots, holes, and/or pores into the article.

12. The method according to claim 10, wherein the article is a tube, and wherein the laser cutting system is configured to cut a plurality of slots, holes, and/or pores into and through a wall of each tube to form a filtration tube that is configured to filter solids from fluids.

13. The method according to claim 10, wherein the first stage comprises a first substage and a second substage, the first substage configured to rotate the article axially about the longitudinal axis and the second substage configured to move the article longitudinally along the longitudinal axis, wherein the first substage is positioned atop the second substage.

14. The method according to claim 10, wherein the at least one mirror of the delivery system comprises a first mirror and a second mirror, both of the first mirror and the second mirror being configured for rotation via a rotatable mount for directing the laser beam, and wherein the method further comprises rotating at least one of the first mirror and/or the second mirror about the rotatable mount to direct the laser beam.

15. The method according to claim 10, further comprising a camera and a relay lens, wherein the camera is configured to take an image of the delivery nozzle to determine placement of the delivery nozzle, and thus the laser beam, relative to the article, and wherein the relay lens is configured to focus the image of the delivery nozzle for the camera.

16. The method according to claim 10, further comprising a monitoring device for measuring a rate of energy from the laser beam being used to cut the article, and wherein the method further comprises measuring the rate of energy from the laser beam during the cutting, and controlling the laser beam and/or the gas from the gas source using the controller based on the measured rate of energy.

17. The method according to claim 10, further comprising a coolant containment unit comprising a coolant source and a coolant delivery nozzle, and wherein the method further comprises delivering the coolant via the coolant delivery nozzle towards the article during cutting thereof.

18. The method according to claim 10, further comprising guide tracks and ball bearings for guiding movement of the article in the longitudinal direction.

19. The method according to claim 11, wherein the controller is configured to control the movement of the first stage relative to the laser beam such that the article comprises a plurality of rows of slots, holes, and/or pores therein, and wherein adjacent rows are offset from one another after cutting.

20. The laser cutting system according to claim 1, wherein the vacuum source is configured to withdraw the slag in the longitudinal direction through the inside of the article.

21. The method according to claim 10, wherein the withdrawing the slag cut from the article comprises withdrawing the slag in the longitudinal direction through the inside of the article.

22. The laser cutting system according to claim 1, wherein the first stage comprises a plurality of ball bearings for supporting and guiding movement of the article axially about the longitudinal axis and longitudinally in the longitudinal direction along the longitudinal axis as the laser beam is delivered to the article.

* * * * *